US010379984B2

(12) United States Patent
Tejerina et al.

(10) Patent No.: US 10,379,984 B2
(45) Date of Patent: *Aug. 13, 2019

(54) COMPLIANCE TESTING THROUGH SANDBOX ENVIRONMENTS

(71) Applicant: MICROSOFT TECHNOLOGY LICENSING, LLC, Redmond, WA (US)

(72) Inventors: David Nunez Tejerina, Bellevue, WA (US); Arthur James Schwab, III, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/342,132

(22) Filed: Nov. 3, 2016

(65) Prior Publication Data

US 2017/0052863 A1 Feb. 23, 2017

Related U.S. Application Data

(63) Continuation of application No. 14/329,854, filed on Jul. 11, 2014, now Pat. No. 9,519,557.

(51) Int. Cl.
*G06F 11/00* (2006.01)
*G06F 11/263* (2006.01)
(Continued)

(52) U.S. Cl.
CPC ............ *G06F 11/263* (2013.01); *G06F 11/07* (2013.01); *G06F 11/2215* (2013.01);
(Continued)

(58) Field of Classification Search
CPC .... G06F 11/263; G06F 11/07; G06F 11/2215; G06F 11/30; G06F 11/3086; G06F 11/3457; G06F 21/53; G06F 2221/034
See application file for complete search history.

(56) References Cited

U.S. PATENT DOCUMENTS

2003/0226062 A1 12/2003 Gender et al.
2009/0132860 A1 5/2009 Liu et al.
(Continued)

OTHER PUBLICATIONS

"Sandbox Centers Create 'Proving Grounds' Where Government and Commercial Organizations Can Test Innovation Viability for Real-World Use-Cases and Bottom-Line Results", Retrieved from <<http://www.kloudtrack.com/kloudtrack-and-cisco-deliver-innovation-sandbox/>>, Sep. 16, 2013, 3 Pages.
(Continued)

*Primary Examiner* — Anthony J Amoroso
(74) *Attorney, Agent, or Firm* — Michael Best & Friedrich LLP (57) ABSTRACT

A compliance user or auditor is enabled to inject failures into a sandbox environment which may be similar to a production service. The sandbox environment, may be monitored by the same automation that watches compliance controls in the production service. As the user injects compliance failures into the sandbox, they may detect the appropriate alerts fire in the monitoring system, thereby gaining trust that the monitoring works as it should. A rich report resulting from the test activities may allow the user or auditor to see how a failure of a compliance control leads to the expected monitoring alert.

20 Claims, 6 Drawing Sheets

(51) Int. Cl.
*G06F 11/30* (2006.01)
*G06F 21/53* (2013.01)
*G06F 11/07* (2006.01)
*G06F 11/22* (2006.01)
*G06F 11/34* (2006.01)

(52) U.S. Cl.
CPC .......... *G06F 11/30* (2013.01); *G06F 11/3086* (2013.01); *G06F 11/3457* (2013.01); *G06F 21/53* (2013.01); *G06F 2221/034* (2013.01)

(56) References Cited

U.S. PATENT DOCUMENTS

| 2011/0239214 | A1 | 9/2011 | Frields et al. | |
|---|---|---|---|---|
| 2013/0275518 | A1* | 10/2013 | Tseitlin | G06F 11/36 709/206 |
| 2013/0297769 | A1* | 11/2013 | Chang | G06F 9/45558 709/224 |
| 2014/0068340 | A1 | 3/2014 | Dayal et al. | |
| 2014/0156557 | A1* | 6/2014 | Zeng | G06Q 10/0631 705/348 |

OTHER PUBLICATIONS

"ThreatCloud Emulation Service", Retrieved from <<https://web.archive.org/web/20140407052211/https://www.checkpoint.com/products/threat-emulation/>>, Retrieved Date: Apr. 7, 2014, 4 Pages.
"Non Final Office Action Issued in U.S. Appl. No. 14/329,854", dated May 19, 2016, 14 Pages.
"Notice of Allowance Issued in U.S. Appl. No. 14/329,854", dated Aug. 9, 2016, 8 Pages.
Bouchenak, et al., "Verifying Cloud Services: Present and Future", In Newsletter ACM SIGOPS Operating Systems Review, vol. 47 Issue 2, Jul. 23, 2013, 14 Pages.
Sheilar, "ActiveState Releases Stackato Sandbox PaaS Test Environment for Enterprise Cloud Application Deployment, Hosting, and Scaling", Retrieved from <<https://web.archive.org/web/20131004143936/http://www.activestate.com/press-releases/activestate-releases-stackato-sandbox-paas-test-environment-enterprise-cloud-applicat>>, Sep. 20, 2011, 1 Page.
Viswanath, Ashwin, "TechTuesdays Session 7 Recording—Cloud Migration: Sandbox Best Practices", Retrieved from <<https://networkinformatica.com/community/informatica-network/products/cloud-integration/cloud_data_integration/blog/2013/09/23/techtuesdays-session-7-recording-cloud-migration-sandbox-best-practices>>, Sep. 23, 2013, 2 Pages.

* cited by examiner

COMPLIANCE TESTING THROUGH SANDBOX ENVIRONMENTS

CROSS-REFERENCE TO RELATED APPLICATION

This application is a continuation under 35 U.S.C. § 120 of co-pending U.S. patent application Ser. No. 14/329,854 filed on Jul. 11, 2014. The disclosure of the U.S. Patent Application is hereby incorporated by reference in its entirety.

BACKGROUND

The proliferation of computerized automation of processes in every aspect of life, data storage and processing have become, a major component of networked systems handling financial and other transactions. In such systems, data is entered, modified, or deleted from a number of sources. The same data is maintained in multiple data stores in same or different formats, and a data store has to pick up or synchronise changes to data based on changes in a different store. Various data stores from simple tables to complicated databases is maintained and synchronized as new entries or modifications are made by different sources. The changes are synchronized at regular intervals, in addition, variety of services are offered to enable internal and external parties' interactivity with the data hosted by the data stores. Consumers of the data as well as providers usually demand certifications associated with the services to enable compliance-associated processes between the parties.

In maintaining a compliant cloud service, providing proof of compliance to compliance customers is part of the process. The proof may need to include a showing that the compliance controls implemented on the service are actually operating as expected. Conventional systems employ an independent third party (an auditor) to collect evidence from, a sample of service components and test them manually. For example, records from 10% of servers may be collected and examined for an indication of compliance. Due to the scale in cloud services, however, even small samples (e.g., 1% or servers) may mean testing thousands of objects. Approaches that provide automated testing in the environment (providing a report of aggregated test results to determine compliance) face the challenge that for customers or auditors, the automation is a black box—they do not have any reason to trust that it is in fact testing the compliance controls in an effective way.

SUMMARY

This summary is provided to introduce a selection of concepts in a simplified form that are further described below in the Detailed Description. This summary is not intended, to exclusively identify key features or essential features of the claimed, subject matter, nor is it intended as an aid in determining the scope of the claimed subject matter.

According to some examples, a method executed an a computing device to provide compliance testing through sandbox environments is described. The method may include enabling injection of a failure mode to a service through an interactive or programmatic user experience managed by a monitoring host; introducing the failure mode to one or more servers of a sandbox, environment; monitoring effects of the introduced failure in the sandbox environment; and providing feedback associated with the monitored effects of the introduced failure through the interactive or programmatic user experience.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a system according to some embodiments may allow a compliance user or auditor to inject failures into a sandbox environment, which may be similar to a production service. In some examples, the sandbox environment may be monitored by the same automation that, watches compliance controls in the production service. As the user injects compliance failures into the sandbox, they may detect the appropriate alerts fire in the monitoring system, thereby gaining trust that the monitoring works as it should. According to other examples, a rich user experience may be provided on the monitoring host that allows the compliance user or auditor to inject failures into the sandbox in an intuitive way be able to see how a particular injection would cause a particular compliance control to fail. A rich report resulting from the test activities may allow the user or auditor to see how a failure of a compliance control leads to the expected monitoring alert.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize thin aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to provide compliance testing through sandbox environments in cloud based services. Examples of platforms include, but are not limited to, a hosted service executed over a plurality of servers, an application executed on a single computing device and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
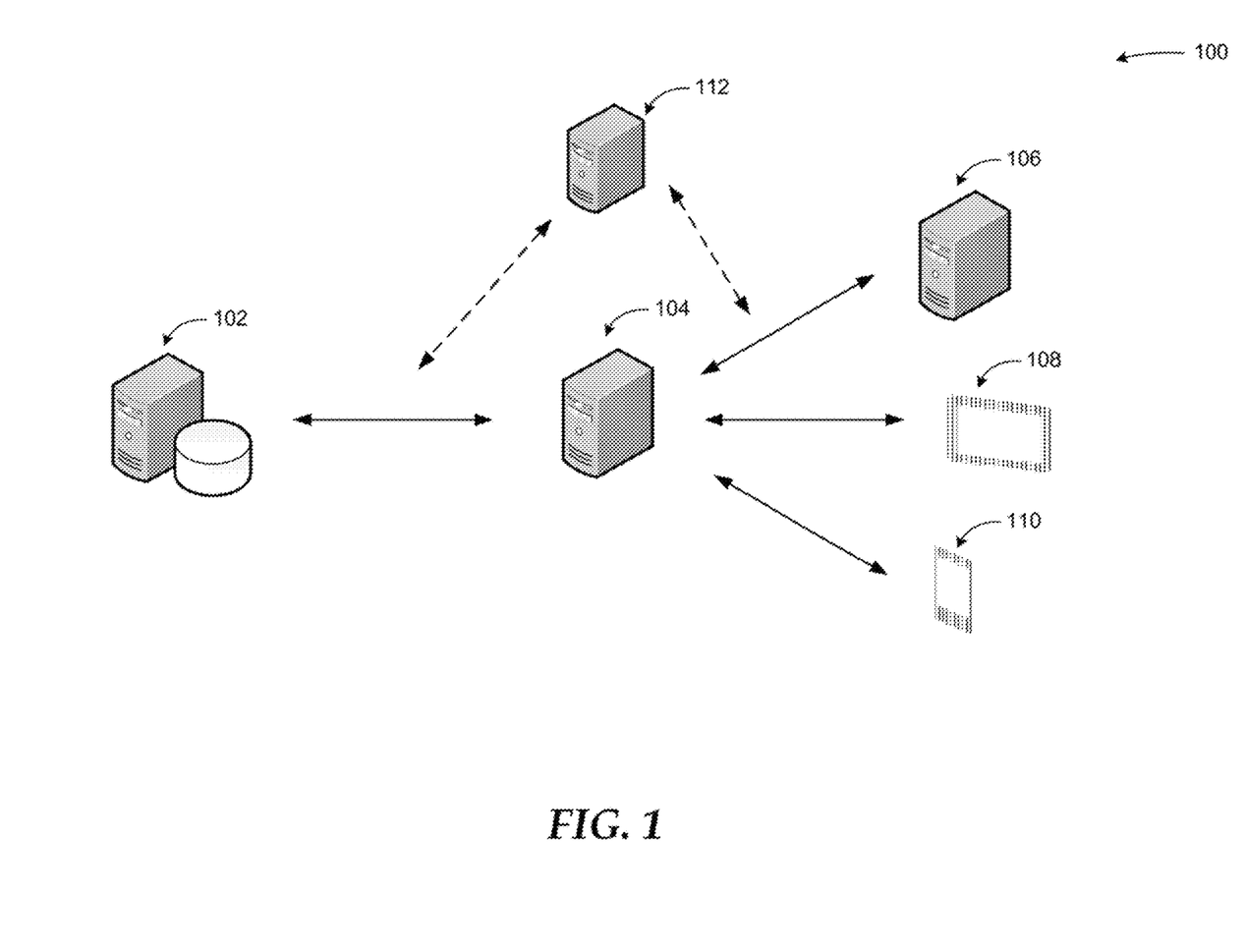
FIG. 1 is a conceptual diagram illustrating an example cloud service, where compliance may be monitored internally or externally (by third parties), according to embodiments.

FIG. 1 includes a conceptual diagram illustrating an example cloud service, where compliance may be monitored internally or externally (by third parties), according to embodiments.

As shown in diagram 100, a server 104, representing a plurality of servers, may provide cloud services. The cloud services may include variety of applications including web services, reporting services, financial services, and similar ones. Consumers of the cloud service may access it through client devices such as tablet 108 or smart phone 110. In other configurations, the cloud service may be accessed by a server 108 of a consuming entity, which in turn may provide the service to its clients (users). The server 104 may operate in conjunction with a number of data storage systems represented by database server 102.

Consumers of the cloud service and/or regulatory authorities may demand compliance with security, privacy, storage, or other requirements. Some cloud services may provide certification documents associated with provided services such as storage policy certification, security policy certification, and similar ones. Compliance certification or on-demand proof of compliance may involve monitoring of cloud service operations. A server of the cloud service provider or a server of a third party certification service (represented by server 112) may monitor cloud service operations such as service-client communications, data storage, handling of security aspects, etc.

As mentioned above, even small samples of compliance testing may mean burdensome operations on the monitoring side of the system. Automated compliance testing aggregating results to determine compliance may not provide sufficient confidence to consumers or auditors. A system according to embodiments may enable active testing through injection of failures into a sandbox environment, which may be similar to the actual cloud service. The sandbox environment may be monitored by the same system(s) that monitor compliance controls in the cloud service. Thus, a user or auditor injecting compliance failures into the sandbox environment may detect the alerts in the monitoring system and gain trust that the monitoring works.

While the example system in FIG. 1 has been described with specific components including a server 104 prodding cloud services, embodiment are not limited to these components or system configurations and can be implemented with other system configuration employing fewer or additional components. Furthermore, embodiments are not limited to compliance, validation, and trust based schemes. The approaches discussed, here may be applied to any compliance testing process for any services provided by an application and/or a server rising the principles described herein.

Figure 2:
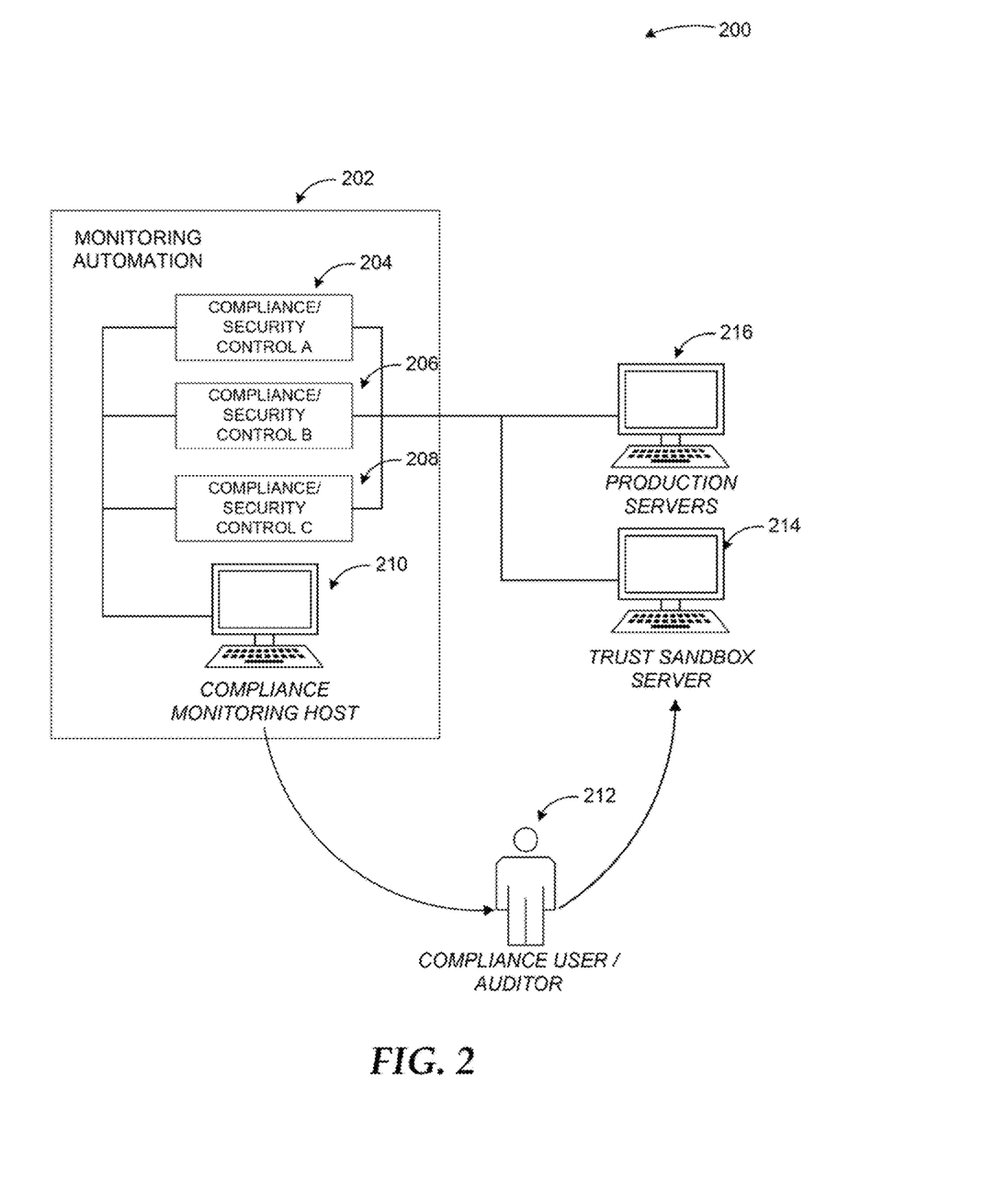
FIG. 2 illustrates an example scheme to test compliance through sandbox environment, according to embodiments.

FIG. 2 illustrates an example scheme to test compliance through sandbox environment, according to embodiments.

As shown in diagram 200, customers and/or auditors 212 may learn trust the compliance monitoring system if they are able to see that for compliance failures, the monitoring system responds (with alerts, reports, etc.) as they expect. The monitoring automation sub-system 202 may include a list of compliance controls 204, 206, and 208 including details on how to automatically test each one. The results of these tests may be aggregated and provided (e.g., in form of rich reports) by the monitoring host 210. The monitoring host 210 may present an interactive or programmatic user experience that may enable the customer and/or auditor 212 to interact with the environment easily and understand the impact, of his/her changes in terms of the monitoring system.

Through their experience with the monitoring host 210, the customer and/or auditor 212 may see which controls are effective, and which are not. The monitoring system may operate on two or more environments simultaneously. For example, multiple sandboxes may be provided for different customers, etc. The production servers 216 may provide the cloud service to customers. The second environment (the trust sandbox 234) may include the same configurations and server roles as the production servers 216 except for the same scale—it may comprise a smaller set of machines.

In some embodiments, the customer and/or auditor 212 may have privileged access to the trust sandbox 214 and may introduce or inject any compliance control breaking change they wish. The user experience of this server may allow the customer and/or auditor 212 to either change server settings directly or to select a pre-packaged control failure injection from a menu of options (e.g., for users who are not technically knowledgeable enough to know what server settings they need to change to create a particular compliance failure). The customer and/or auditor 212 may then look at the compliance monitoring host, which because it is monitoring the controls in the trust sandbox 214 may register the failure that the customer and/or auditor 212 expects to see. Because the monitoring host responds in the same way to the same controls in production servers and the trust sandbox, the customer and/or auditor 212 may gain trust in the automation introducing various failures in the sandbox, and seeing that the monitoring responds as expected.

The monitoring host 210 may also perform additional tasks such as risk analysis, automated audits, etc. in addition to providing a user experience to the compliance controls and reports based on compliance testing results.

Figure 3:
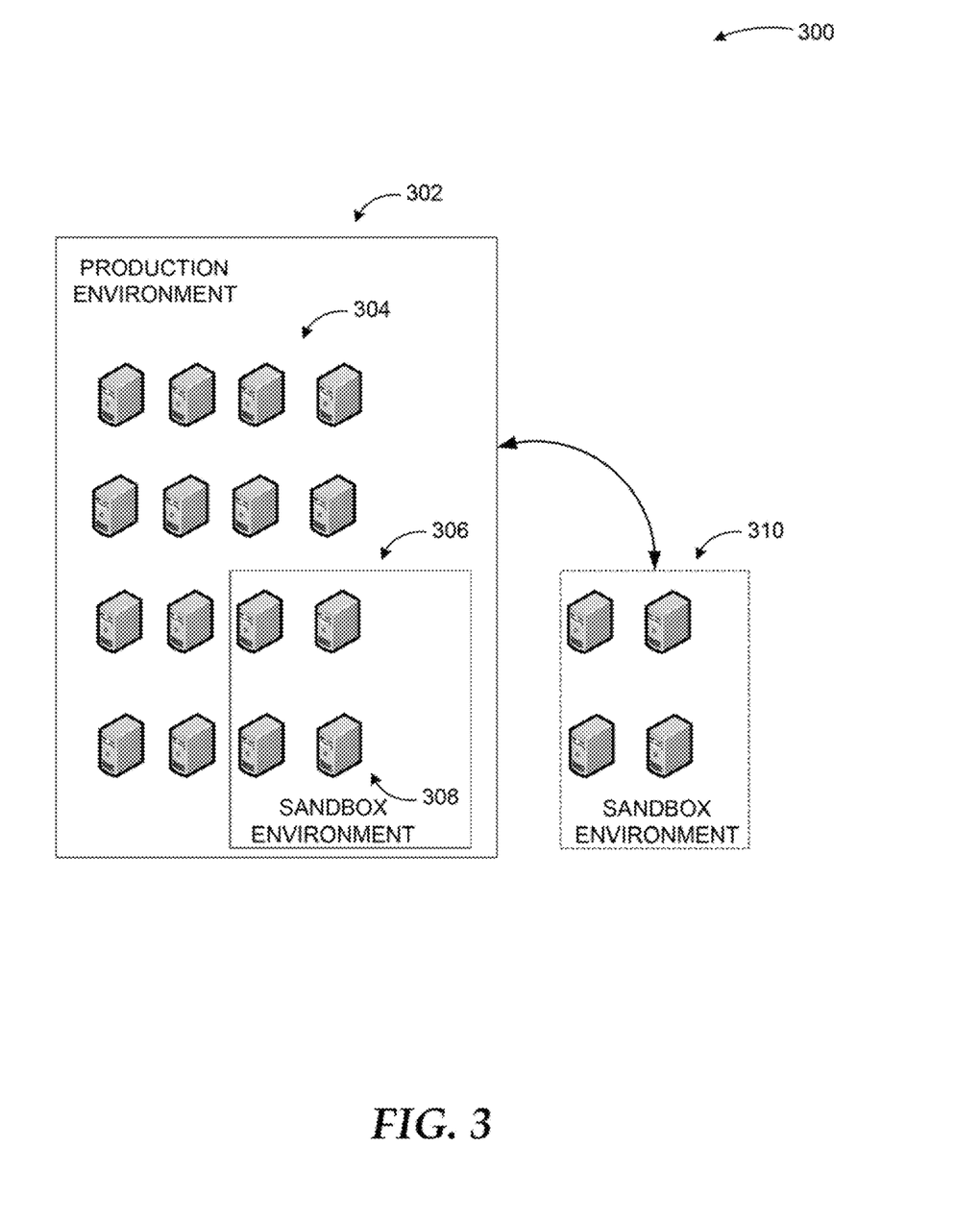
FIG. 3 illustrates two examples of sandbox environments in relation to a production environment according to embodiments.

FIG. 3 illustrates two examples of sandbox environments in relation to a production environment, according to embodiments.

As shown in diagram 300, a production environment 302 for a cloud service may include a number of servers 304. In some embodiments, the sandbox environment 310 may include servers that are separate from the servers of the production environment 302. The servers of the sandbox environment 310 may have same or similar configuration, roles, etc. to duplicate introduced failures without the same scale of the production environment, as discussed above. Changes 10 the production environment 302 such as role changes, additional roles, configuration changes, etc. may be reflected in the sandbox environment 310 periodically or upon change.

In other embodiments, servers 308 among the production servers 304 may be selected for the sandbox environment 306. These real production servers acting as the sandbox environment servers may be selected by the compliance system or by the customer/auditor requesting the compliance monitoring. In some cases, the selected servers may preserve their roles and configurations, but be taken off production operations and server for compliance testing purposes only. In other cases, the selected servers may continue to perform a subset of their production tasks, but measures may be taken to prevent the compliance testing (introduced failures) from affecting actual production environment operations.

In further embodiments, the sandbox servers may be real machines (physical servers) or virtual machines (interface). The sandbox, interlace may also be a server or an interface.

The example scenarios and schemas in FIGS. 2 and 3 are shown with specific components, data types, and configurations. Embodiments are not limited to systems according to these example configurations. Compliance testing through sandbox environments may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
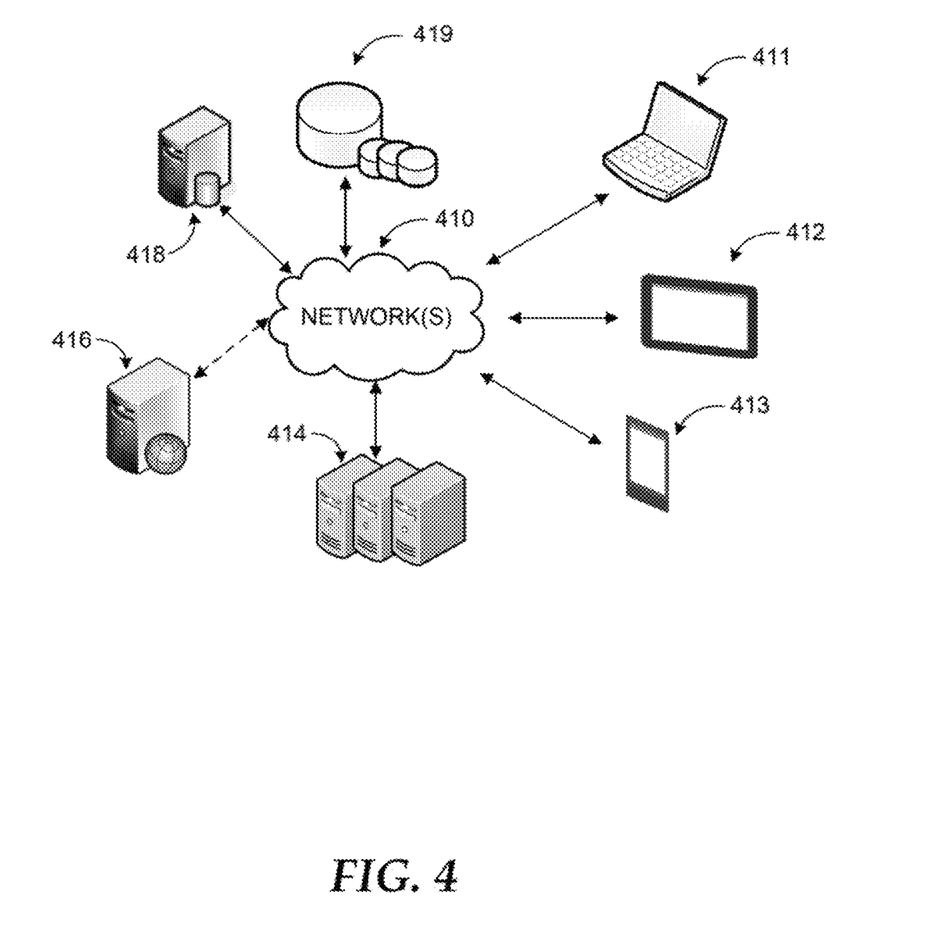
FIG. 4 is a simplified networked environment, where a system according to embodiments may be implemented.

FIG. 4 is an example networked environment, where embodiments may be implemented. A system providing compliance testing through sandbox environments may be implemented via software executed over one or more servers 414 such as a hosted service. The platform may communicate with client applications cat individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. A monitoring application acting a monitoring host may provide a user experience based on user introduced failures and test scenarios to the client devices 411-413. The monitoring application may retrieve a component information associated with a status of a service from a data store maintaining the component information. The monitoring application may store the updates or additional data associated with the component information in data store(s) 419 directly or through database server 418.

Network(s) 410 may comprise any topology of servers, clients, internet service providers, and communication media. A system according, to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide compliance testing through sandbox environments. Furthermore, the networked environments discussed in FIG. 4 are for illustration purposes only. Embodiments are not limited to the example applications, modules, or processes.

Figure 5:
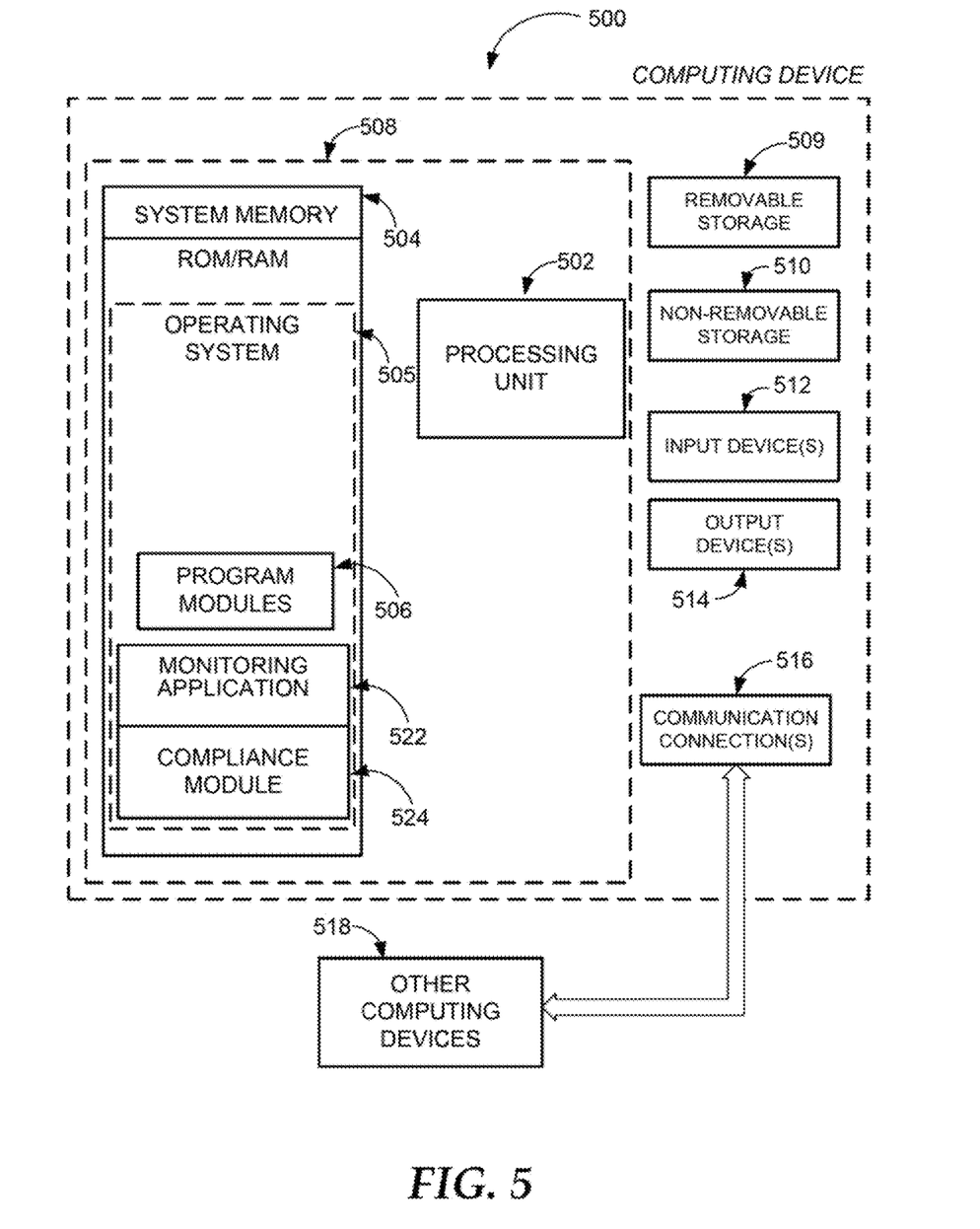
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a compliance application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, a monitoring application 522, and a compliance module 524.

The monitoring application 522 may automatically generate certification documentation. The monitoring application 522 in, conjunction with the compliance module 524 may allow a compliance user or auditor to infect failures into a sandbox environment, which may be similar to a production service. The sandbox environment may be monitored by the same automation that watches compliance controls in the production service. As the user injects compliance failures into the sandbox, they may detect the appropriate alerts fire in the monitoring system, thereby gaining trust that the monitoring works as it should. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction, with one or more human operators performing some. These human operators need not be collocated with each oilier, but each can be only with a machine that performs a portion of the program.

Figure 6:
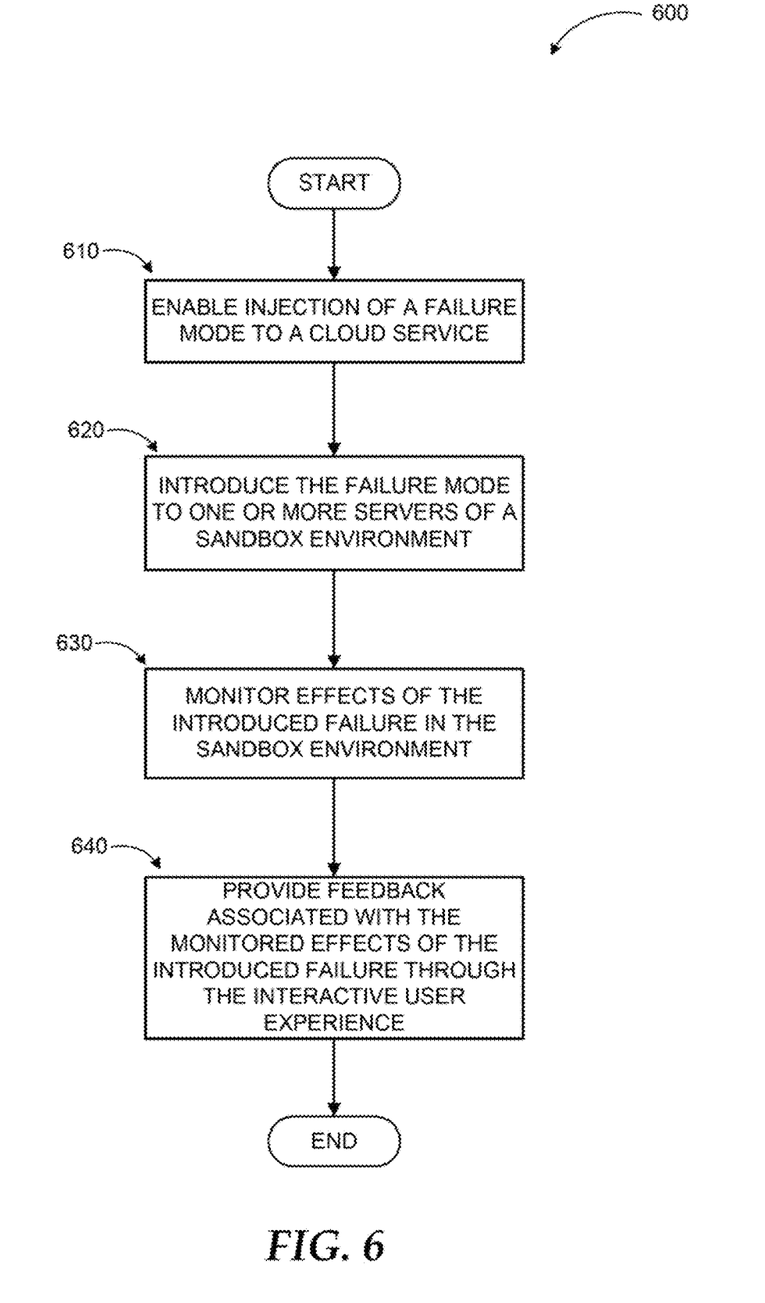
FIG. 6 illustrates a logic flow diagram for a process to provide compliance testing through sandbox environments according to embodiments.

FIG. 6 illustrates a logic flow diagram for a process to provide compliance testing through sandbox environments according to embodiments. Process 600 may be implemented on a certification application.

Process 600 begins with operation 610, where a customer or and auditor may be enabled to inject a failure mode to a cloud service through an interactive or programmatic user experience managed by a monitoring host. At operation 620, the failure mode may be introduced to one or more servers of a sandbox environment, where the sandbox environment, may be part of the production environment or a separate environment with servers having similar roles, configurations, etc.

At operation 630, effects of the introduced failure in the sandbox environment may be monitored by the monitoring host. At operation 640, the monitoring host may provide feedback associated with the monitored effects of the introduced failure through the interactive or programmatic user experience in form of rich reports or other formats.

The operations included in process 600 are for illustration purposes. Compliance testing through sandbox environments n may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to provide compliance testing through sandbox environments, the method comprising:
monitoring a sandbox environment and a production environment of a service using the same monitoring host simultaneously, wherein the sandbox environment includes one or more servers replicating roles and configurations of servers of the production environment;
receiving an active selection from a user through an interactive or programmatic user experience managed by the monitoring host to actively select injection of a failure mode to the service during operation of the sandbox environment and, in response to the active selection by the user, introducing the failure mode to one or more servers of the sandbox environment during the operation of the sandbox environment;
monitoring effects of the introduced failure in the sandbox environment using the monitoring host; and
providing a rich content report associated with the monitored effects of the introduced failure through the interactive or programmatic user experience to report to the user whether the monitoring host, as monitoring the production environment, responds properly to the failure mode.

2. The method of claim 1, wherein the sandbox environment includes a subset of servers of the production environment having roles and configurations distinct to remaining servers of the production environment.

3. The method of claim 2, further comprising: updating the configurations of the one or more servers of the sandbox environment in response to a change in the configurations of the servers of the production environment.

4. The method of claim 1, further comprising: updating the roles of the one-or more servers of the sandbox environment in response to one of: a change in the roles or an addition of the roles of the servers of the production environment.

5. The method of claim 1, further comprising: providing privileged access to the sandbox environment to one of a customer or an auditor to enable the injection of a compliance control breaking change.

6. The method of claim 5, wherein providing privileged access to the sandbox, environment to one of the customer or the auditor to enable the injection of the compliance control breaking change through a list of pre-packaged control failure options through the interactive or programmatic user experience.

7. The method of claim 1, further comprising: providing feedback associated with the monitored effects of the introduced failure includes a risk analysis and automated audits.

8. A computing device to provide compliance testing through sandbox environments, the computing device comprising:

a memory device configured to store instructions;
a processor coupled to the memory device, the processor executing a monitoring application and a compliance module in conjunction with the instructions stored in the memory device,
wherein the monitoring application is configured to:
monitor a sandbox environment and a production environment of a cloud service simultaneously, wherein the sandbox environment includes one or more servers replicating roles and configurations of servers of the production environment; and
receive an active selection from a user through an interactive or programmatic user experience to actively select injection of a failure mode to the cloud service during operation of the sandbox environment; and
the compliance module is configured to:
during operation of the sandbox environment, introduce the failure mode to the one or more servers of the sandbox environment in response to the active selection by the user;
monitor effects of the introduced failure in the sandbox environment; and
provide a rich content report associated with the monitored, effects of the introduced failure through the interactive or programmatic user experience to report to the user whether the monitoring application, as monitoring the production environment, responds properly to the failure mode.

9. The computing device of claim 8, wherein the sandbox environment includes a subset of servers of the production environment having roles and configurations identical to remaining servers of the production environment except for a scale of the production environment.

10. The computing deuce of claim 9, wherein the subset of servers are selected based on one of random selection or a customer input.

11. The computing device of claim 9, wherein the subset of servers are configured to preserve their roles within the production system.

12. The computing device of claim 9, wherein the subset of servers are further configured to prevent from performing production environment tasks during a duration of the compliance testing.

13. The computing, device of claim 9, wherein the subset of servers are further configured to continue performing a subset of production environment tasks during a duration of the compliance testing.

14. The computing device of claim 8, wherein, the monitoring application is further configured to: update the roles and configuration of the one or more servers of the sandbox environment periodically or upon completion of a change in the roles and configurations of the servers of the production environment.

15. The computing device of claim 8, wherein the compliance module is further configured to: select the servers of the sandbox environment based on an input from one of an auditor injecting the failure mode or a customer injecting the failure mode.

16. A production system to provide compliance testing for a cloud service, the production system comprises:
a plurality of servers;
a subset of the plurality of servers of a sandbox environment having replicating roles and configurations of servers of the production system;
a communication interface configured to communicate between the plurality of servers and a monitoring host,
wherein the monitoring host in conjunction with a monitoring application configured to:
monitor the sandbox environment and the production system of the cloud service simultaneously;
receive an active selection from a user to actively select injection of a failure mode to the cloud service during operation of the sandbox environment through an interactive or programmatic user experience and, in response to the active selection by the user, introduce the failure mode to the one or more servers of the sandbox environment during the operation of the sandbox environment;
monitor effects of the introduced failure in the sandbox environment; and
provide a rich content report associated with the monitored effects of the introduced failure through the interactive or programmatic user experience to report to the user whether the monitor host, as monitoring the production environment, responds properly to the failure mode.

17. The production system of claim 16, further comprising: provide feedback associated with the monitored effects of the introduced failure include one of: a risk analysis or automated audits.

18. The production system of claim 16, wherein the monitoring application further configured to retrieve a component information associated with a status of the cloud service from a data store maintaining the component information.

19. The production system of claim 18, wherein the monitoring application further configured to store updates associated with the component information in the data store directly or through a database server.

20. The production system of claim 16, where in the one or more servers of the sandbox environment and production system are one of physical servers or virtual servers.

* * * * *